(12) United States Patent
Soetjahja

(10) Patent No.: US 8,073,790 B2
(45) Date of Patent: Dec. 6, 2011

(54) ADAPTIVE MULTIVARIATE MODEL CONSTRUCTION

(76) Inventor: Hendra Soetjahja, New York, NY (US)

( * ) Notice: Subject to any disclaimer, the term of this patent is extended or adjusted under 35 U.S.C. 154(b) by 832 days.

(21) Appl. No.: 12/041,622

(22) Filed: Mar. 3, 2008

(65) Prior Publication Data

US 2008/0222061 A1 Sep. 11, 2008

Related U.S. Application Data

(60) Provisional application No. 60/894,214, filed on Mar. 10, 2007.

(51) Int. Cl.
*G06F 15/18* (2006.01)
*G06N 3/00* (2006.01)
*G06N 3/12* (2006.01)

(52) U.S. Cl. .............. 706/13; 706/12; 706/14

(58) Field of Classification Search .................. None
See application file for complete search history.

(56) References Cited

U.S. PATENT DOCUMENTS

| | | | |
|---|---|---|---|
| 6,223,133 B1* | 4/2001 | Brown | 702/85 |
| 7,395,235 B2* | 7/2008 | Dhurandhar et al. | 705/36 R |
| 7,593,905 B2* | 9/2009 | He | 706/13 |
| 7,630,928 B2* | 12/2009 | Bonissone et al. | 705/36 R |
| 2004/0083452 A1* | 4/2004 | Minor et al. | 717/109 |
| 2007/0094162 A1* | 4/2007 | Aragones et al. | 706/13 |

OTHER PUBLICATIONS

Myers, Raymond H., "Classical and Modern Regression with Applications", Second Edition, Duxbury, 1989, pp. 1-7, 164-173, 178-186, 190, 193-194.

Michalewicz, Zbigniew, "Genetic Algorithms+Data Structures=Evolution Programs", Third Edition, Springer-Verlag, 1996, pp. 13-31, 33-44.

Koza, John R., "Introduction to Genetic Programming". In Kenneth E. Kinnear, Jr., "Advances in Genetic Programming", MIT Press, Cambridge, MA, Apr. 7, 1994, pp. 21-25.

* cited by examiner

*Primary Examiner* — Oamr Fernandez Rivas

(57) ABSTRACT

The present embodiment is able to find the optimal or near optimal variables composition of multivariate models by an evolutionary process within acceptable amount of time and resources that are less than using full variables permutation methodology. Subjected to any data, it adaptively identifies and constructs the most effective combination of the relevant variables to achieve one or more objectives. The objective could be for high explanatory power, high predictive power, response measure, or other objectives that the user defines. The present embodiment solves the sequential F-test problem by conducting non-sequential and non-linear search. The algorithm also solves partial F-test dilemma by evaluating all candidate variables membership intact, maintaining fidelity of full variables membership test throughout its permutation. Furthermore, the stochastic nature of the algorithm neutralizes the prejudices of manual decisions in variables identification and membership construction.

20 Claims, 5 Drawing Sheets

Examples of genome going through crossover or mutation operation $G_1$ = (100011000101101001111000001110)
$G_2$ = (*111011101001110000100011111011*)

The random generated position number for k is 9. These genomes are splice after the 9th bit and recombine. The first part of $G_1$ with the second part of $G_2$, while first part of $G_2$ with the second part of $G_1$.

The random generated position number for m is 8. The $8^{th}$ bit is mutated from 0 to 1 or vice versa.

Example of genes within a genome representing variables, showing the mapping of genes to variables.

(PE,   ROIC,   GARP,   PMO,   EMO,   OEY)
(1      0      1      0      0      1  )

FIG. 6

ADAPTIVE MULTIVARIATE MODEL CONSTRUCTION

CROSS-REFERENCE TO RELATED APPLICATIONS

The present application claims the benefit of provisional application No. 60/894,214, filed on Mar. 10, 2007, which application is specifically incorporated herein, in its entirety including drawings, by reference.

OTHER REFERENCES

Myers, Raymond H., "Classical and Modern Regression with Applications", Second Edition, Duxbury, 1989.
Neter, John, "Applied Linear Statistical Models", Richard D. Irwin Inc, 1974.
Bowerman, Bruce L., "Linear Statistical Models, An Applied Approach", Duxbury Press, 1986.
Chatterjee, Samprit, "Regression Analysis by Example", 2nd Edition, John Wiley & Sons Inc, 1991.
Wetherill, G. Barrie, "Regression Analysis with Applications", Chapman and Hall, 1986.
Holland, John H., "Adaptation in Natural and Artificial Systems", University of Michigan Press, 1975.
DeJong, Kenneth, "On Using Genetic Algorithms to Search Program Spaces", Grefenstette: Proceedings of Second International Conference on Genetic Algorithms, 1987.
Michalewicz, Zbigniew, "Genetic Algorithms+Data Structures=Evolution Programs", Third Edition, Springer-Verlag, 1996.
Koza, John R., "Introduction to Genetic Programming".

FEDERALLY SPONSORED RESEARCH

Not Applicable

SEQUENCE LISTING OR PROGRAM

Not Applicable

BACKGROUND

1. Field of Invention

The present embodiment relates generally to the field of statistics and mathematical modeling employing multivariate regression and, more specifically to using genetic algorithm to construct the independent variables composition of the multivariate regression models while optimizing one or more objectives. The objectives of these models includes but not limited to explanatory, prediction, and response measure.

2. Prior Art

Mathematical multivariate (or multi-variable) regression analysis is employed as an analytic tool for any number of reasons. One of them being the need to develop an estimate of a functional relationship, which we can use for prediction or forecasting. Another motivation for multivariate regression may be to estimate rates of change of response with respect to particular regressor variables, i.e. estimates of regression coefficients. The other reason would be explanatory; that is to extract meaning from the data.

The primary challenge in building MultiVariate Regression models, otherwise also referred to herein as MVR models, is to determine which regressor variables truly influence the response output, i.e. to determine what variables are truly relevant. The problem evolves from uncertainty of what variables to include in the model and in what combination thereof. The decision can be further complicated by the existence of multicollinearity or perhaps by the scientists' prior views and prejudices regarding the importance of individual variables. Assumptions are made regarding correctness of a postulated model when we are truly trying to find the best approximation that describes the data. Using the traditional method, a successful model builder will eventually understand that with many data sets, several models can be fit that would appear to be nearly equal in effectiveness. Thus, the problem that one deals with is the selection of one model from a pool of candidate models. Unfortunately, a human modeler could never be certain which one among all the candidate models found thus far may represent the global optima, if any at all. This is due to the fact that many of the candidates of 'best' model are only optimal to the subpart of the variables set, i.e. locally optimal.

Valuation on the appropriateness of a regressor variable often depends on what regressor variables are in the model combined together with it. Some combinations of the variables may in fact cause adverse results, possibly from multicollinearity or other noise, corrupting the explanatory power of the model. Thus a full scale variable screening can not be accomplished effectively by using stepwise sequential F-test or partial F-test methods although they are much quicker to evaluate and utilize less compute resources.

One would logically think that the variables evaluation should go through full permutation of all candidate variables. This is certainly true, but it is not practical in reality since the costs of computing all permutations could be far beyond the constraints of resources making it almost impossible to be accomplished. Those constraints may include but not limited to time required to evaluate all possible permutations and computing technology available. For example, to evaluate all permutations of n independent variables in a multivariate regression model, we must compute $2^n$ model tests. Therefore, to evaluate 45 independent variables requires us to compute 245 scenarios or 35,184,372,088,832. That is over 35 billion scenarios to be computed and the costs could be further increased by the size of statistical data that needs to be processed per scenario. Imagine how long it would take to test the scenarios on 10 years of time-series data per scenario. So it is obvious why stepwise method, with its quicker evaluation time than full permutation, has become the standard methodology for building MVR models. Unfortunately, stepwise method has severe drawbacks associated with sequential F-test, partial F-test, and human prejudices. Hence, the present embodiment uses genetic algorithm instead.

In stepwise sequential method, the valuation of adding a regressor variable into the model is fully dependent on which sequence the variable is being added into the combination. A sequential process of regressor variables test starting from variables combination of (A, B) may not give the same end result if the sequence of test was to start from variables combination of (C, D) and on. One would hope that both sequential paths end up with identical variables combination of (C, F, H, I, K, R, S, U) as the optimal model, but in reality they most often do not. This problem occurs on all types of stepwise variables evaluation such as forward and backward evaluations.

While in partial testing, one immediately encounters the problem of how to segment the full list of potential variables, such as the number of variables that should be tested at any given time. Furthermore, partial testing of variables may only give the local optima result. For example, partial testing of 12 potential variables may produce models with (A, B, C, H, S, R) and (A, H, S, X, Y, Z) combinations as the pool of optimal models; which is certainly not even close to resemble the true global optimal of (C, F, H, I, K, R, S, U). This underscore the problem of presuming that 6 variables combination to be optimal, as suppose to 8 variables combination in partial variables set testing.

Another significant challenge in multivariate regression modeling is the fact that the data represents dynamic events, hence, rendering a static model functionally useless in its explanatory power to describe what is currently happening as suppose to what was happening long in the past. A static model may become over-specified or under-specified at different time in the future as the dynamics of the data shift even though it was properly specified during the time it was built. This is also known as prediction bias and it arises because the determination of the final model is uniquely related to the observation data at hand during the time the final model was built. If we are to refer back to the 45 variables evaluation example, we could not finish the evaluation before the market dynamic has shifted again. To put it another way, the challenge of building predictive models with multivariate regression is to find the appropriate combination of variables that has the most explanatory power while remaining current in its predictive accuracy within the given resources. We wish to obtain an MVR model that is adaptively accurate at reasonable amount of resources.

Genetic Algorithms belong to the class of probabilistic algorithms, but they are different from pure random algorithms since they combined both directed and stochastic search. They maintain a population of potential solutions, while most other search algorithms maintain only a single point of the search space. A single point search algorithms inherently have the problem of reaching local optima and prematurely stipulates it as global optimality. Genetic Algorithm performs a multi-directional and non-linear search by maintaining a population of potential solutions and encourages information formation and exchange between these directions. The population undergoes a simulated evolution: at each generation, the relatively "good" solutions reproduce, while the relatively "bad" solutions die. Genetic algorithms are search algorithms that are based on natural selection and genetics. They combine the concept of survival of the fittest with a randomized exchange of information. In each genetic algorithm generation there is a population composed of plurality of genomes. Those genomes can be seen as potential solutions to the problem being solved. In each successive generation, a new set of genomes is created using portions of the fittest of the previous generation. However, randomized new information is also occasionally included so that important data are not lost and overlooked.

SUMMARY

As explained before, the key challenge in building accurate MVR models are on the identification of variables that are "truly" relevant and have desirable combined contribution. We would like to build models that are accurate and relevant to any data that the models are being subjected to so that we could utilize it to with high confidence. Once the relevant independent variables have been identified, the mechanics of mathematical regression could be implemented by people who are reasonably skilled in the art. However, in reality identifying the relevant independent variables is an elusive task and subjective experience of the modeler becomes a significant contributing factor. Unfortunately, subjective process most often impedes clarity of judgment. There will be times in which modelers discard important variables or add particularly insignificant variable because their past experiences has swayed their judgment. In extreme case, the model comes to misrepresent the world it is suppose to clarify and to draw meaning to. Subsequently, it misguides the users in forecasting based on illusions.

The essence of the present embodiment is to have genetic algorithm determines multivariate regression model independent variables composition by an evolutionary process. Subjected to any data, the present embodiment automatically identifies the relevant independent variables and constructs the optimal or near optimal combination of the said relevant independent variables to achieve one or more objectives. The objective could be for high explanatory power, or high predictive power, or response measure, or other objectives that the user defined within the fitness function. Since the present embodiment will automatically construct the variables composition when subjected to any data to satisfy the objective(s) defined in the fitness function, it is in effect, an adaptive MVR model building methodology. In other words, the present embodiment's algorithm also solves the need for dynamic capability in multivariate regression models since its adaptive evolutionary nature will automatically detect and incorporate the most relevant genes or variables.

By employing genetic algorithm in MVR modeling, the present embodiment can find global optima or near global optima solution in an acceptable amount of time and resources that are much less than using full variables permutation methodology.

The traditional manual way of building multivariate regression model put the burden of variable screening and variables combined-sets construction on the modeler's subjective judgment. A human subjective judgment is full of presumptions and prejudices. As the model go through sequential and/or partial F-test process, the so called "best" model in reality was generated from partial local optimality and/or from flawed sequential ordering of the regressor variables during its testing.

The present embodiment, by utilizing genetic algorithm, solves the sequential F-test problem by conducting non-sequential and non-linear search. This is accomplished by allowing at least one gene mutation in random order.

The algorithm solves partial F-test dilemma by the fact that the variable test procedure evaluates the whole genome (i.e. all candidate variables intact) maintaining fidelity of full variables membership throughout its permutation.

Under the traditional methodology, often there is no single unique 'best' set of independent variables that appears obvious, so several equally good models of subset variables are selected and evaluated. Traditionally this can be accomplished by searching other combination within the same number of independent variables. For example, 32 out of 45 candidate variables presuming that 32 variables is the ideal fitting when the modeler found one 32-variables model that appears to be good. In reality 32-variables combination may just be a fortuitous chance that particular combination reaches local optima. Globally, it may be an overfit or an underfit. Genetic algorithm solves this problem by collecting all the 'best of breed' genomes, with flexible number of variables membership. The algorithm is not constraint in looking for any particular number of variables in a set, rather, it searches for many different number of variables membership.

Furthermore, the stochastic nature of said algorithm neutralizes the prejudices of manual decisions in variables screening, unlike its human modeler counterpart. Variables inclusion by the algorithm is based on "survival of the fittest", in which the best genomes (i.e. best combinations of genes or variables) remain in the population of "good" solutions. As the algorithm proceeds, the pattern of which models among the pool of candidates are the better models will emerge after several generations by its very nature. It would then be easy to identify which is the best solution among the best of breed according to the attributes that you preferred. Conversely, several solutions may be selected as viable models.

Another advantage of using the present embodiment is the element of flexibility. Since a multivariate regression equation can be used for several purposes, the set of variables that may be 'best' for one purpose may not be 'best' for other purposes. In this embodiment, the fitness function f(x) objective parameters determine the exact purpose such that the set of variables is constructed for the appropriate objective by the genetic algorithm automatically. In general, the purposes of multivariate regression models include but not limited to explanatory, prediction, and measuring response. The algorithm will automatically adapt to build any model to satisfy the user's objectives. The user communicates his objectives by defining the fitness function parameters.

Hence, this embodiment is able to be used in constructing the optimal independent variables set for many different problem statements without changing the algorithm structure. Users only need to tailor the fitness function to accomplish their objectives or applications. An organization may create a repository library of f(x) modules with each f(x) accomplishing a different purpose but reusable by many users within the organization. This reduces labor duplication and resources waste. For example, a pharmaceutical company may use the same system for different drug clinical tests. Each product development team in the company only needs to define a fitness function f(x) for that particular type of drug. Better yet, the organization may already have a common shared reusable library that anyone could access and check in new f(x). In this manner, not each and every product developer needs to define a new f(x). Users skilled in the art of programming may categorize this approach as Object Oriented programming.

In short, the algorithm will automatically adapt to build any multivariate regression model that is appropriate to the user's objectives. The user communicates his objectives to the system by defining the fitness function parameters.

This embodiment also had the advantage of portability. It could be implemented on any platform of software and hardware, homogenous or heterogeneous.

DRAWINGS

The teachings of the present embodiment can be easily understood by considering the following detailed descriptions in conjunction with the accompanying drawings.

FIG. 5a illustrates the genomes and its genes composition and crossover operation example.

FIG. 5b illustrates the genomes and its genes composition and mutation operation example.

FIG. 6 illustrates genome composition for an example.

DETAILED DESCRIPTION OF EMBODIMENTS

Figure 1:
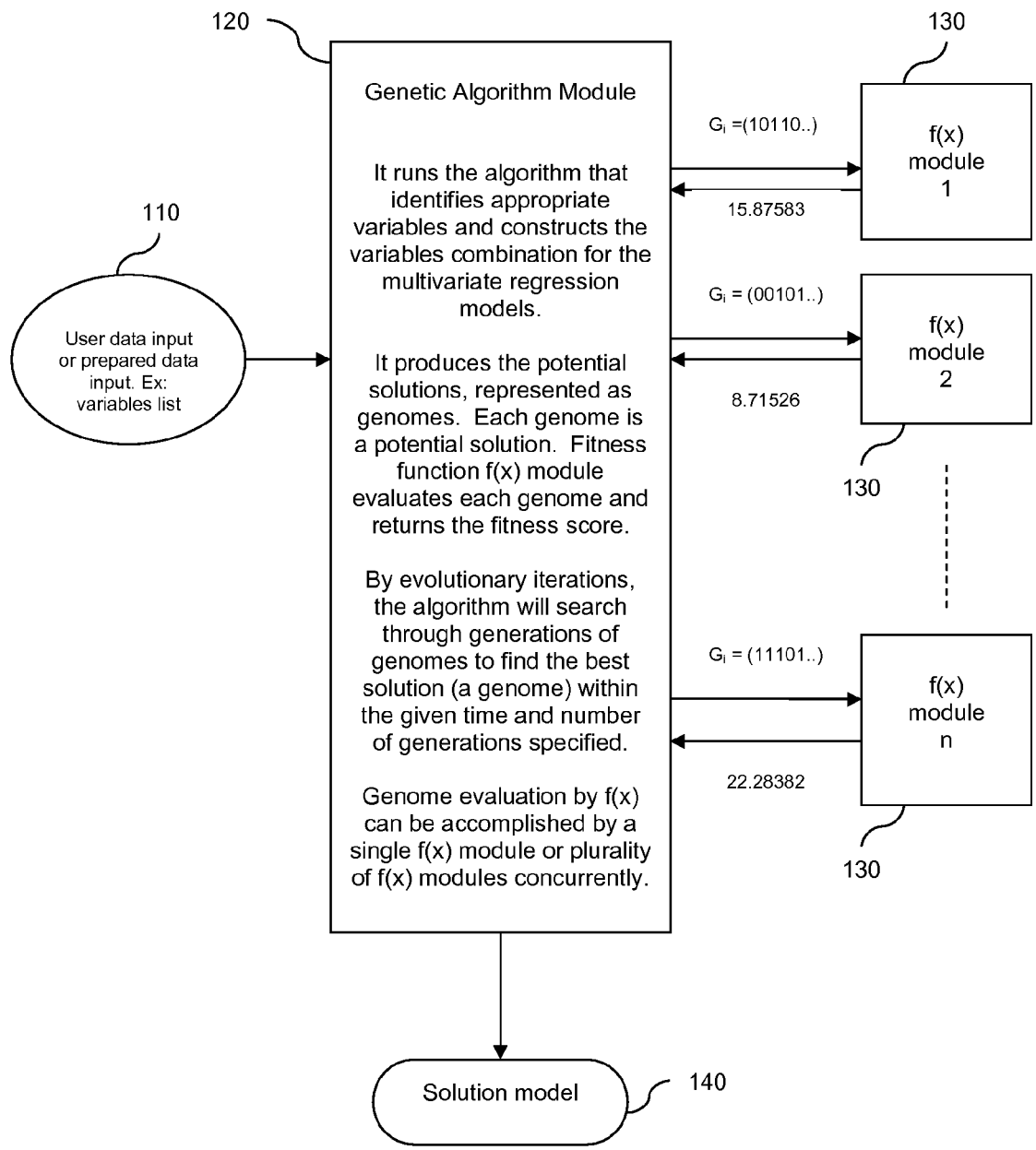
FIG. 1 illustrates the general architecture on the integration of Genetic Algorithm with Multivariate Regression modeling.
Figure 2:
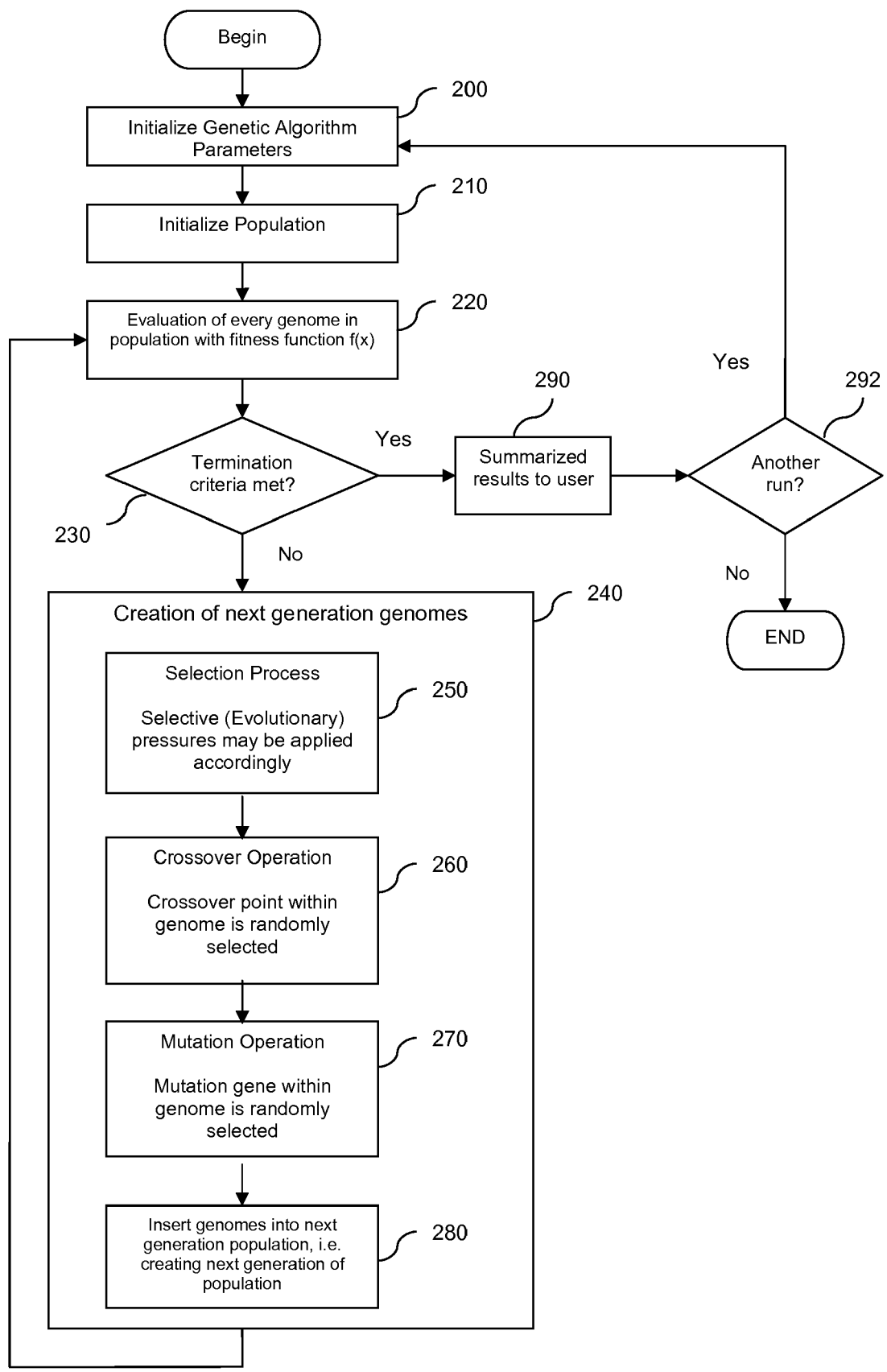
FIG. 2 is a flowchart illustrating the Genetic Algorithm that directs the building of Multivariate Regression models according to present embodiment.

FIG. 1 and FIG. 2 illustrate the constructs that genetic algorithms are based on. A basic concept of a genetic algorithm is that it defines possible solutions to a problem in terms of genomes in a population. Hence, each genome represents a potential solution to the multivariate regression model's variables parameter. A genome, also known as a bit string, is made up of a vector of genes, also known as variables, or bits. Each gene has possible value. A particular gene also has string position that denotes its position in the genome. A group of genomes constitutes a population. The number of genomes in a population (so called population size) depends on the particular problem being solved.

In a functioning genetic algorithm, genomes are coded as potential model solutions to the problem. A genome represents a multivariate regression model, while the genes within the genome represent the variables of the said model. For example, a genome for each model could be constructed by giving each of these genes (or bits) a value that represents the presence or absence of a variable in the model. In the exemplary embodiment, 0's represent variables exclusion (or absence), while 1's correspond to variables inclusion (or presence) in the multivariate regression model. However, other data structures and implementations are certainly possible. No limitation of genomes to a binary vector form of representation is intended.

The fitness function f(x), otherwise also referred to herein as the evaluation function or f(x), decodes the binary genes of that particular genome to a list of variables to be included in the multivariate regression model. It then builds the multivariate regression model in accordance to the variables designation and finally computes it to produce a quantitative representation of the result. There is no intention to limit the representation of the result in quantitative form herein. Users are allowed to use other forms such as symbolic and logical forms as long as the genetic algorithm modules would be able to make comparative evaluation on the level of merit of the results. In other words, the genetic algorithm needs to know which fitness evaluation result of a genome is better than the next genome. It is, however, more convenient to use a quantitative system herein as an example and ease of understanding.

The fitness function f(x) and its quantitative result are defined by the user according to their specific need and application. Genetic algorithm is not domain specific; hence variations of multivariate regression models being built for many different applications are allowed in the operation of the embodiment. The genetic algorithm is capable of running on many different variations of fitness function f(x) that communicates in terms of genome representation input and measurable output.

Initial information such as the list of candidate variables to be considered in building the multivariate regression model may be provided manually by a user, or it may be obtained automatically by the genetic algorithm module via appropriate connections with databases, application software, or online information sources. The manner in which the information can be acquired, stored, and the manner in which the genetic algorithm module 120 retrieves such information from external databases or online information sources is well understood by those of skill in the art.

In one embodiment, the module 120 has direct programmatic access to the variables, statistical, or time-series information. In another embodiment, it can obtain access to the information 120 through an application programming interface, or even simple data importation. The particular details of how the information is obtained are not material to the operation of the embodiment.

As with the variables information, the manner in which the genetic algorithm module 120 retrieves other information from external databases or online information sources is well understood by those of skill in the art, and the details are not material to the embodiment.

In short, the algorithm will be supplied with the initial information required in one manner or another and in return, the algorithm will automatically construct the appropriate genome length in the plurality of genomes as defined by population size and search for the best solution model within the defined convergence criteria parameters.

Having explained the construct under which genetic algorithms function, the way in which they function will next be discussed. FIG. 2 depicts the functioning of a genetic algorithm. For ease of explanation, we will use 'step' and 'module' interchangeably herein. Users skilled in the art should realize that step or module may involve many smaller steps within the implementation of the present embodiment or exemplary embodiments.

Initialization of Genetic Algorithm Parameters:

The first step is the genetic parameters initialization (module 200). Initialization is accomplished by the operator specifying a number of details relating to the way in which the genetic algorithm will function. Details that may need to be specified or chosen at the initialization step 200 include but not limited to, population size, probabilities of certain operators taking place, termination criteria, and expectations for the final solution.

Although the population size is usually chosen to be constant, the algorithm is certainly capable to accommodate dynamic population size. Limitation to a particular population size is not intended herein. During this stage, the probability parameter for crossover or mutation operator can be set as well.

The details necessary for initialization depend in part on the exact functioning of the genetic algorithm. The parameters that are chosen at initialization may dictate the time and resources necessary to determine the desired solution using the genetic algorithm. It should also be understood, that the initialization step 200 is not mandatory in that all of the information obtained through the initialization step 200 can be included within the algorithm itself and may not require additional input during the initialization step.

Initialization of Genomes Population:

Then, a genome population is initialized by the initialization module 210. The genome population comprises a plurality of genomes. Selection of the initial population is usually accomplished through random selection of genomes but could be accomplished by other methods as well.

In one embodiment, the genomes are in the form of vectors, though other data structures and implementations are certainly possible. The length of the vector (or the number of genes within a genome) is equal to the number of variables to be considered in building the multivariate regression models, though other length is also possible.

The number of genomes making up the initial population is determined in part by parameters chosen at the initialization step. The population size is determined so that the genetic algorithm of the present embodiment efficiently and thoroughly searches the solution space. An initial genome population of 20 to 50 genomes is useful, but more or fewer can be used. In the context of the present embodiment the terms "vector" and "genome" will be used interchangeably herein, but no limitation of genomes to a vector form of representation is intended. Each genome comprises a plurality of "genes" with each gene representing a regression variable.

Generally, a random number generator is used to create the initial population by determining values for each gene in each genome. This is to allow the algorithm to fully "explore" the space of possible solutions through random starting points throughout the search space. Crossover and mutation operations further decouple interdependence between the genes space. On the other hand, it does not hurt to insert few genomes that the user conjectures to have high probability to be the solution since it may speed up convergence. This action does not introduce persistent prejudice or preference to the system since the algorithm will throw out genomes that do not score well out of the pool of potential solutions even if it is inserted by the user initially.

Fitness Function f(x)

Next, the fitness of the genomes in the population is determined in the evaluation of the fitness step 220. The fitness valuation of a genome is dependent on the particular problem that the genetic algorithm is optimizing. For example, the fitness score may represent the cost, the rate of effectiveness for the specified task, the error variance, or a combination thereof. The fitness of a genome must be able to be measured and determined, using a formula for example. Each genome in a population has a specific fitness value. For the ease of operation, the fitness value is preferred to be quantitatively determined, although other types of representation are possible.

Figure 3:
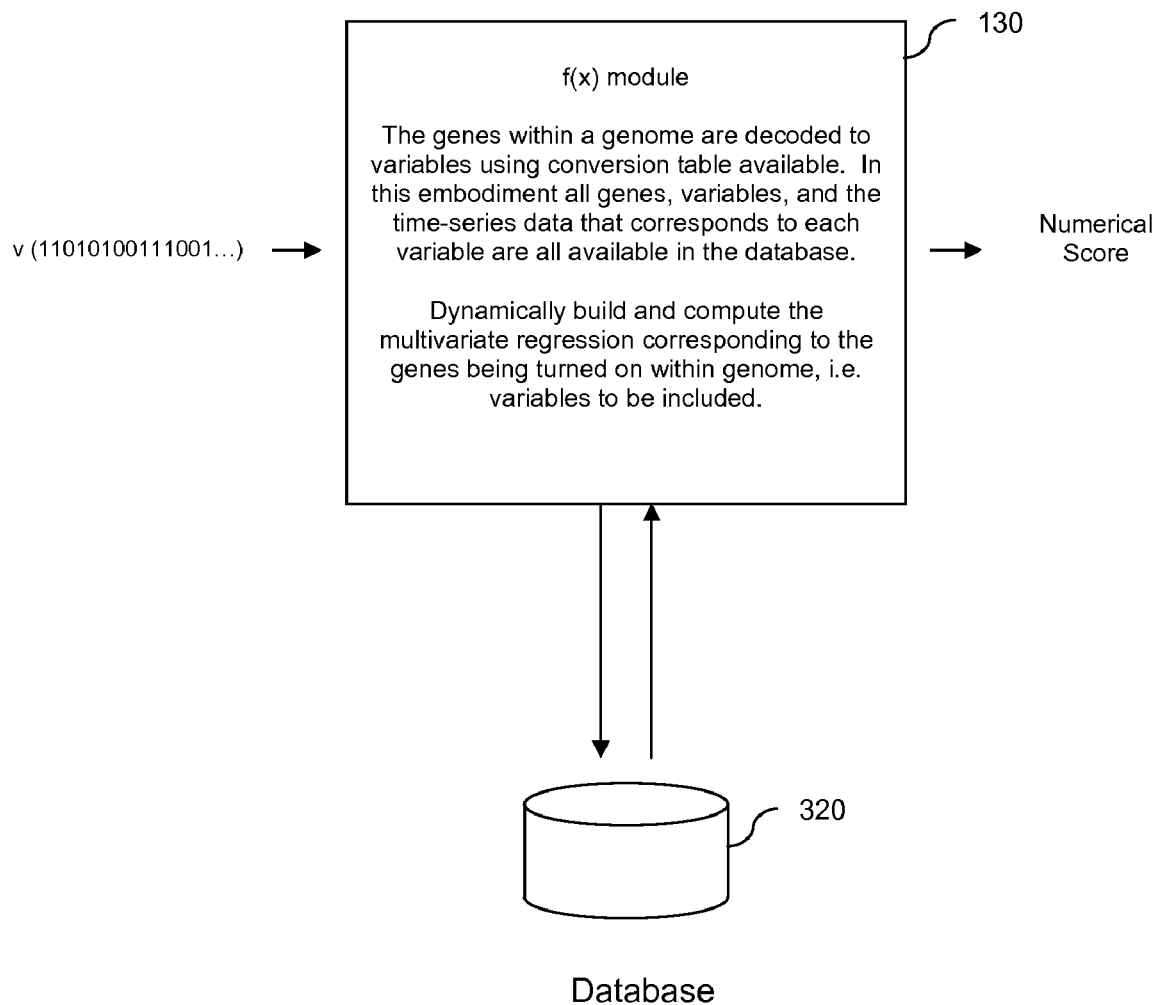
FIG. 3 illustrates a single fitness function f(x) module that dynamically builds and compute Multivariate Regression model according to present embodiment.

FIG. 3 is the basic f(x) module 130 that first decodes the genome to variables parameter of multivariate regression model, then builds the model, and finally computes it to produce quantitative result.

First, the f(x) module 130 decodes the binary genes of the genome. The decoded information is the instruction on what variables should be included in the multivariate regression model to be built and computed. In this exemplary embodiment, we are using 1 as inclusion (or presence) of the variable and 0 as exclusion (or absence) of the variable in the equation to be solved and computed.

Using the basic multivariate regression equation for n independent variables as follows:

$$y_i = \beta_0 \sum_{k=1}^{n} \beta_k X_{ki} + \varepsilon_i$$

A genome $G_1=(101001)$ will be decoded to mean that the multivariate regression model includes the 1st, 3rd, and 6th variables on the list. Hence in present example, f(x) is instructed to compute a multivariate regression equation or model as follows:

$$y_i = \beta_0 + \beta_1 X_{1i} + \beta_3 X_{3i} + \beta_6 X_{6i} + \varepsilon_i$$

The module then obtains the necessary data that correspond to variables under consideration $X_1$, $X_3$, and $X_6$ from the database or any other data source. The manner in which the f(x) module 130 retrieves variables information from external databases or other information sources is well understood by those of skill in the art, and the details are not material to the embodiment.

In another example, genome $G_2=(111001)$ will be decoded to a multivariate regression equation that comprises of $X_1$, $X_2$, $X_3$, and $X_6$ terms as such:

$$y_i = \beta_0 + \beta_1 X_{1i} + \beta_3 X_{3i} + \beta_6 X_{6i} + \varepsilon_i$$

Similarly, the fitness function f(x) may also be defined as to solve higher-order multivariate regression equation. It should be emphasized that the algorithm is not domain specific and is able to solve many different types of multivariate regression equations. In an example of second order multivariate regression equation building, the said genome $G=(101001)$ coding translates to an equation that utilizes the 1st, 3rd, and 6th variables on the list as follows:

$$y_i = \beta_0 + \beta_1 X_{1i} + \beta_3 X_{3i} + \beta_6 X_{6i} + \beta_{11} X_{1i}^2 +$$
$$\beta_{33} X_{3i}^2 + \beta_{66} X_{6i}^2 + \beta_{13} X_{1i} X_{3i} + \beta_{16} X_{3i} X_{6i} + \beta_{36} X_{3i} X_{6i} + \varepsilon_i$$

Once the equation has been determined by the decoder, the module then solves the equation and produces score associated with the particular genome under evaluation. The scoring of the multivariate regression equation may use theoretical values or observable values. These MVR valuations include, but not limited to its prediction interval value, Coefficient of Determination $R^2$ (Multiple Correlation Coefficient) value, adjusted $R^2$ value, $S^2$ (Residual Mean Square) value, MSE (Mean Squared Error) value, and $C_k$ (Standardized MSE) value. People skilled in the arts are familiar with many of these criteria and it can easily be implemented.

Other users may prefer a scoring system that is observable such as the real profit and loss of the forecasted stocks if he was to use the present embodiment as stock forecasting tool. The user may also use a combination thereof, or form his own integrated equation for scoring. The user is responsible in defining what the desirable score is since the user may define which type of scoring valuation to use. In other words, in some cases the best genome is the one with the highest score, while in other cases it may be the lowest scoring genome. For ease of explanation, the fitness scoring in this exemplary embodiment assumes that the highest scoring genome is the best.

The embodiment can also accommodate other types and other orders of MVR equations satisfactorily within the fitness function. The MVR equations above are described herein as exemplary and should not be misconstrued as limitation.

FIG. 6 illustrates an example of a genome representing financial variables. It shows the genes to variables mapping in corresponding order.

Convergence Criteria

The next step is the check if the convergence criteria (also referred to herein as termination criteria) have been achieved step 230. In classic genetic algorithms this is often referred to as checking to see if the fitness of the genomes meets some defined fitness criteria. Generally, in practical applications, the possible or acceptable level of fitness may not be known before hand since we do not have a priori knowledge, so the genetic algorithm may be stopped after some number of generations, or after some number of generations where there is no significant change in the fittest genome for example. In either context, this step checks to see if the requirements, whether number of generations or fitness value of the genome, have been met. Any number of genomes either will meet the criteria or will not meet the criteria. Please note that the user may adjust the convergence criteria according to their particular usage.

If the convergence criteria have been met, the algorithm is considered to have reached optimality within the specified parameters. In this case the next step is the selection of the final population step 290 and the optimal genome. Determining the final population can be achieved in a number of different ways, including but not limited to, selecting the best scoring genomes from many different generations that are listed in the global table. The best scoring genome is to be considered the final solution model or globally optimal model. User may choose to override the best scoring genome for other genomes in the 'best of breed' population. The user is also not required to select a final population if the final genome suffices the user's criteria as the optimal model. In short, it would be helpful to have the final population of the best scoring genomes, but it is not mandatory. As noted before, the user must define the desirable scoring direction. In some applications, the highest scoring genome is desirable; while in some other cases, it is the lowest scoring genome that is being searched for.

Output of the final population can be accomplished in a number of different ways, including but not limited to, printing the attributes of the final population to a hard copy version, saving the attributes of the final population in an electronic format or database, or using the final population to control or manage some process.

If the termination criteria are not satisfied step 230, the process continues to create the next generation of genomes step 240.

Selection of Genomes for Crossover (Mating)

If the termination criteria are not satisfied (step 230), the process continues to create the next generation of genomes (step 240). In this step, the parent genomes, chosen in the selection of the mating pool (step 250), are combined either with or without modification to create the next generation of offspring. Not every created member of the mating pool need be modified in the creation of the offspring (step 240). Often whether or not a particular member of the mating pool is modified is determined by probabilities. These probabilities can either be specified initially or can be determined by information from the mating population or the mating pairs, for example. Modification of the offspring can be accomplished in a number of ways, called operators. Usually operators are applied with a given probability to the members of the mating pool. Generally utilized operators include, but are not limited to crossover, mutation, inversion, dominance-change, segregation and translocation, and intra-genome duplication. Only crossover and mutation will be explained herein, however, the user is encouraged to refer to many publications on the subject.

Selection (step 250) in a genetic algorithm can be accomplished in a number of ways, but is generally based in part on the fitness of the involved genomes. For example, genomes can be selected by using a biased roulette wheel, with each genome in the population is given a chance for mating. The chance of mating for each genome being proportional to the determined fitness score of each genome. For example, the fitness score $F_i$ for genome $G_i$ is used as a threshold and a random number R in the range of 0 to max F is selected. The genome is selected for mating if $F_i$>R. Otherwise the genome is skipped. Because very good genomes will have very high $F_i$'s, R will more likely be less than their fitness $F_i$. Very poor genomes are less likely to be picked since their fitness scores will be relatively lower. Roulette wheel selection is continued until the genetic algorithm module 120 has selected two mating genomes from the genome population.

According to another embodiment, tournament selection is used for selecting the mating genomes. Specifically, a first superior genome is selected from a first set of two randomly chosen genomes in the initial genome population. Then, a second superior genome is additionally selected from a second set of two randomly chosen genomes in the initial genome population. The first and second superior genomes are the selected genomes for mating. Superiority of each genome is determined based on the fitness score for each genome computed above. Tournament selection is continued until the genetic algorithm module 120 has selected two mating genomes from the genome population.

There is no limitation on selection methods is intended herein. The algorithm functions well with many different types of selection pressures. The user is may fine tune the operation of the algorithm by his choice of selection pressure methodology. For example, there are elitist selection, fitness-proportionate selection, roulette-wheel selection, scaling selection, tournament selection, rank selection, generalization selection, hierarchical selection, and steady-state selection. The details on these selection pressure methodologies are available on many publications and not the focus herein.

Genomes Crossover (mating) to Create Offspring

Thereafter, the two selected genomes are mated by the mating or crossover module (module 260) to create offspring genomes. Mating or crossover operation in Genetic Algorithm is the process by which the genes on two different genomes are interleaved between the two genomes. There are a number of different types of crossovers, including but not limited to one-point, two-point, uniform, and arithmetic.

According to one possible embodiment, the selected genomes are mated by single-point crossover. One-point crossover is accomplished by randomly selecting a position, k along the genome, which is between 1 and the genome length less 1. Two offspring are created by switching all genes between the position k+1, and the full length of the genome. In other words, initially the first mating genome has a first portion and a second portion divided by the common crossover point k and the second mating genome also has a first portion and a second portion divided by the common crossover point k. Then, the second portion of the first mating genome is replaced with the second portion of the second mating genome to create an offspring genome. Similarly, the second portion of the second mating genome is replaced with the second portion of the first mating genome to create another offspring genome.

FIG. 5*a* illustrates a one-point genome crossover. A crossover point k is randomly chosen on the two unmodified genomes. In this example, k is 9. Offspring genome G1' contains the genes from the first portion of the first genome G1 including the crossover point gene ($9^{th}$ gene), plus the second portion of genes after the crossover point k from genome G2. Similar operation was performed to produce offspring G2' as depicted on FIG. 5*a*. G2' contains the genes from the first portion of genome G2 plus the second portion of genes after the crossover point k from genome G1.

Two-point crossover is performed by randomly selecting two crossover points k and p. The first offspring is created by copying the part from the beginning of the genome to the first crossover point from the first mating genome, copying the part from the first to the second crossover point from the second mating genome, and copying the part from the second crossover point to the end of the genome from the first mating genome. Similarly, the second offspring is created by copying the part from the beginning of the genome to the first crossover point from the second mating genome, copying the part from the first to the second crossover point from the first mating genome, and copying the part from the second crossover point to the end of the genome from the second mating genome.

In short, multi-point crossover is performed by randomly selecting more than one crossover points, alternately copying the parts of the genome between crossover points from the first mating genome and the second mating genome to create offspring genomes.

Uniform crossover is performed by randomly copying from either the first mating genome or the second mating genome to create an offspring genome. That is, the length of the genome is traversed and at each bit location a bit is copied into the offspring genome from either the first mating genome or the second mating genome, using a random selection function to select which parent genome's bit it copied into the offspring.

Arithmetic crossover is carried out by performing a certain arithmetic operation with the first and second mating genomes to create an offspring genome. For example, the first and second mating genomes represented can be added to obtain the offspring genome.

Mutating Genomes

Genomes or offspring genomes are mutated at some frequency by the mutation module 270. Mutation is the process by which one or more genes on a genome are modified. Each gene is chosen for mutation with a probability of mutation that is usually determined in the initialization step of a genetic algorithm. More than one gene on a genome may be mutated in one event. The probability of mutation is generally much lower than the probability of crossover. Mutation is generally thought of as a way to ensure that useful genes are not lost. Multiple mutations can occur on one or more than one genomes in the population. The number of genes that can have mutations in one genome occur ranges from 1 to n, where n is the number of genes in a genome.

Mutation is carried out by (i) selecting a bit in the offspring genome to mutate by random selection in a uniform distribution, and (ii) changing the selected bit in the offspring genome from zero (0) to one (1), or vice versa, according to the mutation rate.

In other embodiment, mutation can also be carried out by (i) selecting a bit in the offspring genome to mutate by random selection in a uniform distribution, (ii) determining what value to change the selected bit also by random selection, and (iii) changing the selected bit according to the determined value.

According to one embodiment, the mutation rate is 0.01%, and this is implemented by selecting a single integer in the range of 1 to 10,000, and mutating only when a randomly selected number in the range equals the selected integer.

Another approach is to set the mutation rate as the threshold itself, and mutate only if a randomly selected number is below the threshold. The low frequency mutation rate is selected such that it is high enough for the genetic algorithm to explore the solution space effectively but low enough to prevent destruction of information obtained during mating.

FIG. 5*b* represents a one genome mutation. The gene at the genome that occupies the mutation point m is then changed to some other gene. In a binary encoding, mutation is switching a 0 to a 1, or vice-versa. Since this is done usually with low probability, certain genes undergo mutation, and certain do not.

Creating or Inserting Genomes Into Next Generation of Genome Population

Thereafter, the offspring genomes are inserted into the genome population and a new generation genome population is obtained based on a strategy by the insertion module 280. In one embodiment, the replacement strategy adds the offspring genome to the initial genome population to obtain a modified genome population. Then, the fitness score of each genome in the modified genome population is determined in the manner described above. Thereafter, a first predetermined number or percentage of the worst genomes is removed from the modified population based upon the determined fitness of the modified genome population. Finally, a second predetermined number or percentage of the best genomes in the initial population is added to the modified genome population based upon the determined fitness of the initial genome population. For example, 25 worst/best vector maybe selected, or alternatively the 10% worst or best vectors. The resultant modified genome population is the new (next generation) genome population. After the creation of the offspring in module 280, the determination of the genomes fitness (step 220) is repeated, followed by the check if the convergence criteria have been achieved (step 230). The cycle is continued until the convergence criteria are satisfied. As mentioned above, if the population does meet the convergence criterion, the output step 290 is undertaken and the algorithm is complete.

The combined operations of selection, mating (crossover), mutation, and offsprings selection for the next generation population can be considered as evolutionary methodology. The present embodiment is not limited on any particular combination of evolutionary methodology and should not be misconstrued to have such limitation. It is useful for the user to explore different parameters of evolutionary methodology that suits their specific application. Tailoring the operators and parameters of evolutionary process effectively tunes the algorithm to the problem while solving it.

Few selection methods that are available include, but not limited to elitist, fitness-proportionate, roulette-wheel, scaling, tournament, rank, generalization, hierarchal, steady-state selections. While the methods for crossover include, but not limited to single point crossover, multi-points crossover, and even distribution crossover. As for mutation operations, we can use single and multi genes.

Please note that since genetic algorithms have many parameters that could be fine-tuned or tailored to users' needs, the preferred embodiment or other variety of embodiments listed herein should be taken as exemplary not as the only way to implement the concept. In other words, I do not wish to be bounded by the exact particulars or details of the present embodiment since there are other possible embodiments that could perform satisfactorily and still abides by the essence of the concept.

The present invention and/or the present embodiment can be used in many applications that utilize multivariate regression. This usage is not limited to any particular industries, organizations, or geographic parameters. Listed below are examples of what the embodiment can be utilized in, but it is by no means should be misconstrued as a limited list of applications:

Present embodiment can easily be used to build a financial forecasting model to predict the likelihood of stock prices in the future.

Financial companies can use the present embodiment in statistical arbitrage application.

Alternatively, the algorithm and embodiment may be utilized to build an econometric model to forecast economic conditions in the future to guide government economic policies. The economists will be alleviated with the burden of manually determining which economic variables truly drive the particular policy.

In one embodiment for marketing research application, marketers would use the algorithm to build a demand forecast model for any particular product to capture a market segment based on potential demographic variables of that particular market segment. Hence, the Genetic Algorithm would determine which particular demographic variables are relevant for selling the product.

While in another embodiment for political strategists, f(x) may produce the numerical representation of which demographic variables are relevant to any particular voting trend.

Pharmaceutical companies can use embodiment with fitness function that produces numerical rating of drug clinical test as a function of patients' physiological variables. Multivariate regression models were used to test the hypothesis under varying sets of assumptions.

In another embodiment, Insurance companies would like to see f(x) as a predictor for which demographic variables contribute the highest accident claims so that they could price their premium accordingly.

Credit card companies would like to know which demographic variables truly drive their offerings.

Manufacturing would like to know which process variables are the relevant contributor to producing the highest yield.

Utility companies such as ConEdison, may use the algorithm to build seasonal energy consumption model to forecast electricity demands and therefore forecast their based material (petroleum, coal, or natural gas) needs accurately to reduce volatility in their based cost of operation.

Conclusion, Ramifications, and Scope

The genetic algorithm is able to search an enormous, nonlinear search space with a number of variables to find an optimal or near optimal solution for optimizing or satisfying numerous objectives specified by the user through the user defined fitness function. Moreover, the present embodiment is not limited to a certain type of genome representation and can be used with numerous types of application by tailoring the fitness function. In addition, the solution can be found in an acceptable period of time.

The above detailed description and explanation have clearly shown that the present embodiment is superior to traditional method of specifying multivariate regression models in several areas.

First, the optimal or acceptable solution can be obtained within much shorter period of time and with fewer resources than full variables permutation.

Second, the embodiment solves the problem associated with sequential F-test in stepwise method that plagues all statisticians in building MVR models thus far.

Third, the embodiment solves the problem associated with partial F-test in stepwise method that plagues all statisticians in building MVR models thus far.

Fourth, the embodiment neutralizes the human's prejudices and subjective judgment associated with variables identification in multivariate regression models by human modeler.

Fifth, the embodiment's ability to automatically identify and constructs the appropriate variables combination in MVR models with respect to the data or information it is subjected to, effectively makes the methodology an adaptive MVR model builder. Changes in the data, may certainly change the solution model.

Sixth, the embodiment's non-domain specific nature allows flexibility in defining the objectives to be achieved in constructing the appropriate variables set in the MVR models. This flexibility allows the same system to be used in constructing MVR models to satisfy many different objectives defined within the fitness functions.

It is convenient and useful to use a quantitative based fitness value, but it is not required as long as the valuation system has comparative methodology to ascertain the relative value of one genome to another. In other words, genomes in the population must be able to be ranked in terms of which genome is better than the others. In previous sections, we used quantitative based examples for ease of explanation and clarity of understanding. However, in other embodiments, user may use symbolic or logical representation as scoring system.

Figure 4:
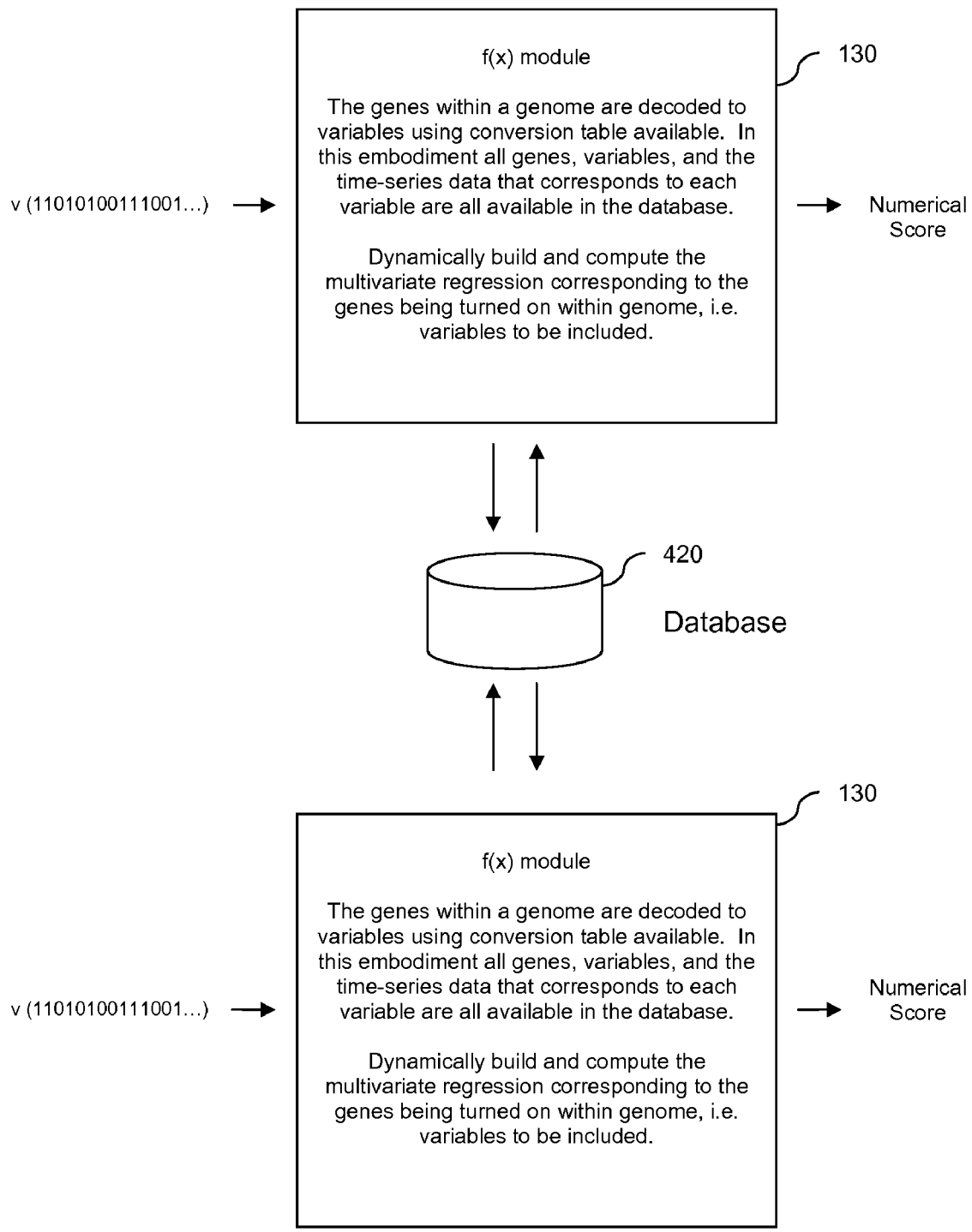
FIG. 4 illustrates multi fitness function f(x) modules that dynamically builds and compute Multivariate Regression model in parallel according to present embodiment.

It is also possible to use plurality of the fitness function modules 130 concurrently or in parallel in order to increase efficiency in finding the optimal solution. FIG. 1 and FIG. 4 illustrate the use of n numbers of fitness function modules computing in parallel manner simultaneously. It is also possible to operate the fitness function modules in asynchronous manner since the time required to evaluate each genome may be different. For example, an evaluation of a genome with 3 regression variables would be faster than the evaluation of a genome with 30 regression variables. Hence, the fitness function module that finishes evaluation of a genome earlier could immediately evaluate another genome in the current population without waiting for the other fitness modules to finish their computation.

Multiple fitness function modules can also operate in a distributed or grid computing manner in plurality of computers connected by networks. In the context of the present embodiment, no limitation of operation to any particular configuration of multi-computers computing is intended. For example, present embodiment can also be implemented in a Parallel Virtual Machine (PVM), Message Passing Interface (MPI), heterogeneous or homogeneous grid computing configuration, or any parallel configurations.

FIG. 4 illustrates an example on the use of plurality of fitness function modules 410 utilizing a common database for its data needs. The database may reside in the same computer or server, but no limitation on the location or the number of database is intended. Configuration described herein can as easily be implemented in multi computers connected with a common network between the fitness function modules and the database servers. In alternative embodiments, plurality of databases may also be replicated with common data content to serve the genetic algorithm modules' or fitness function modules' data needs.

As another computing approach, it is possible to use multiple different genome populations as the initial genome populations and run them concurrently according to the genetic algorithm, rather than using only one initial genome population. For example, one embodiment can utilize 10 genome populations concurrently. This would result in reduction of time required in finding the solution. Crossover operation of genomes between different populations may also be allowed to increase exploration of the search space.

In all these different concurrent, parallel, and distributed computing configurations, it is useful but not mandatory, to have a global table that records and keeps track of all the genome's evaluation attributes. The table records each genome's genes composition, score, generation, number of occurrences, and keeping track on which solution model has the best score (potential global optima). It could also reduce computing time by eliminating potential duplicate computation if the same genome reappears again in the following generation.

The present embodiment is not limited to any particular hardware architecture or CPU (Central Processing Unit) architecture and should not be misconstrued to have such limitation. It can operate well in any computer and operating system; although optimization of the algorithm may be perform accordingly to increase performance.

There is no limitation intended in implementing the present embodiment to any particular operating system or programming languages. No limitation is intended on the use of Graphical User Interface with the present embodiment even though it is not discussed in detail herein. People skilled in the arts could easily incorporate said technology to work synergistically with the present embodiment.

The present invention has been described in particular detail with respect to one possible embodiment or plurality of embodiments herein. Those of skill in the art will appreciate that the invention may be practiced in other embodiments not mentioned herein. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. Some of these operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including hard disks, floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While one or more embodiments of the present invention have been described in the above detailed description, and illustrated in the drawings, the invention is not limited thereto but only by the scope and spirit of the appended claims.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

Thus, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail hereinabove. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of a single embodiment are not limited to that embodiment but may be included and/or arranged in various combinations in any of the other embodiments as well, as will be understood those skilled in the art.

Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

The user interaction with each "device", which may be real or virtual (implemented as a software construct in a relatively general purpose computer), is preferably carefully designed for each device. A common user interface paradigm is preferably provided for corresponding functions, while the user interface is preferably optimized for dealing with the specific functions of each particular device. Thus, a similar user interface and screen layout is employed for functions that are the same across a variety of devices. In this regard, it is an aspect of an embodiment of the invention to translate user interface systems, even in a high level state, to other forms. Thus, in a multi-brand environment, related components may have native interfaces which are both well developed and distinctly different. Therefore, the present invention allows for a translation or remapping of the functionality into a common paradigm. Where aspects cannot be adequately translated, the native interface may be presented to the user. It should be understood that the preferred embodiments and examples described herein are for illustrative purposes only and are not to be construed as limiting the scope of the present invention, which is properly delineated only in the appended claims.

I claim:

1. A system for deriving at least one multivariate model, wherein said multivariate model being implemented to effect at least one desired objective, and wherein said system comprises of:

one or more processors comprising:
  means of relevant information management including input, output, storage, and display;
  means of producing a plurality of genomes from available information, wherein each said genome representing a multivariate model, and wherein each said genome comprises a plurality of genes representing parameters of said multivariate model, said parameters including independent variables, relevant variables;
  means of selecting a plurality of genomes for creating at least one initial population, wherein said initial population becomes current generation of genomes population;
  means of constructing a multivariate model from each said genome by decoding each of said plurality of genes within said genome to determine the parameters to be included or excluded for said multivariate model;
  means of defining convergence criteria based on desired objective of said multivariate model.

2. A system according to claim 1, further comprising means of defining a fitness function based on at least one desired objective of the multivariate model, wherein said fitness function comprises of:

means of solving said multivariate model with respect to each of said plurality of genomes, and wherein said solution including producing measurable fitness quantity representation with respect to said desired objective.

3. A system according to claim 2, further comprising means of executing genetic algorithm on said current generation of genomes population until defined convergence criteria are met, wherein execution of said genetic algorithm comprises continuously repeating steps of:

means of executing at least one of said fitness function with respect to each and everyone of said plurality of genomes in said current generation of genome population, wherein said fitness function execution produces measurable fitness quantity representation with respect to each of said plurality of genomes, and wherein said fitness representation is assigned correspondingly to each of said plurality of genomes;

means of creating a plurality of offspring genomes from said population, wherein said creation comprises performing a variety permutation of operations of at least one genome selection operations, at least one of genome crossover operations, at least one of genome mutation operations;

means of selecting a plurality of said offspring genomes, wherein the said selected offspring genomes become the current generation of genomes population.

4. A system according to claim 3, further comprising means of selecting at least one multivariate model solution from said genomes population after convergence criteria are met, wherein said selected solution model satisfies at least one of the desired objective.

5. A method for deriving at least one multivariate model, wherein said multivariate model being implemented to effect at least one desired objective, and wherein said method comprises of:
one or more processors executing the acts of:
producing a plurality of genomes from available information, wherein each said genome representing a multivariate model, and wherein each said genome comprises a plurality of genes representing parameters of said multivariate model, said parameters including independent variables, relevant variables;
selecting a plurality of genomes for creating at least one initial population, wherein said initial population becomes current generation of genomes population;
constructing a multivariate model from each said genome by decoding each of said plurality of genes within said genome to determine the parameters to be included or excluded for said multivariate model;
defining convergence criteria based on desired objective of said multivariate model.

6. A method according to claim 5, further comprising defining a fitness function based on at least one desired objective of the multivariate model, wherein said fitness function comprises of:
solving said multivariate model with respect to each of said plurality of genomes, and wherein said solution including producing measurable fitness quantity representation with respect to said desired objective.

7. A method according to claim 6, further comprising executing genetic algorithm on said current generation of genomes population until defined convergence criteria are met, wherein execution of said genetic algorithm comprises continuously repeating steps of:
executing at least one of said fitness function with respect to each and everyone of said plurality of genomes in said current generation of genome population, wherein said fitness function execution produces measurable fitness quantity representation with respect to each of said plurality of genomes, and wherein said fitness representation is assigned correspondingly to each of said plurality of genomes;
creating a plurality of offspring genomes from said population, wherein said creation comprises performing a variety permutation of operations of at least one genome selection operations, at least one of genome crossover operations, at least one of genome mutation operations;
selecting a plurality of said offspring genomes, wherein the said selected offspring genomes become the current generation of genomes population.

8. A method according to claim 7, further comprising selecting at least one multivariate model solution from said genomes population after convergence criteria are met, wherein said selected solution model satisfies at least one of the desired objective.

9. A computer-implemented method for deriving at least one multivariate model, wherein said multivariate model being implemented to effect at least one desired objective, wherein said implementation including utilizing a computer, or a plurality of computers being connected via a computer network, wherein said computers including homogeneous computers and heterogeneous computers, wherein said computers utilizing any operating system or environments, wherein execution of said method in manners including parallel, concurrent, single-threading, multi-threading, synchronous, asynchronous, distributed, and wherein said method comprises of:
one or more processors executing the acts of:
producing a plurality of genomes from available information, wherein each said genome representing a multivariate model, and wherein each said genome comprises a plurality of genes representing parameters of said multivariate model, said parameters including independent variables, relevant variables;
selecting a plurality of genomes for creating at least one initial population, wherein said initial population becomes current generation of genomes population;
constructing a multivariate model from each said genome by decoding each of said plurality of genes within said genome to determine the parameters to be included or excluded for said multivariate model;
defining convergence criteria based on desired objective of said multivariate model.

10. A method according to claim 9, further comprising defining a fitness function based on at least one desired objective of the multivariate model, wherein said fitness function comprises of:
solving said multivariate model with respect to each of said plurality of genomes, and wherein said solution including producing measurable fitness quantity representation with respect to said desired objective.

11. A method according to claim 10, further comprising executing genetic algorithm on said current generation of genomes population until defined convergence criteria are met, wherein execution of said genetic algorithm comprises continuously repeating steps of:
executing at least one of said fitness function with respect to each and everyone of said plurality of genomes in said current generation of genome population, wherein said fitness function execution produces measurable fitness quantity representation with respect to each of said plurality of genomes, and wherein said fitness representation is assigned correspondingly to each of said plurality of genomes;
creating a plurality of offspring genomes from said population, wherein said creation comprises performing a variety permutation of operations of at least one genome selection operations, at least one of genome crossover operations, at least one of genome mutation operations;
selecting a plurality of said offspring genomes, wherein the said selected offspring genomes become the current generation of genomes population.

12. A method according to claim 11, further comprising selecting at least one multivariate model solution from said genomes population after convergence criteria are met, wherein said selected solution model satisfies at least one of the desired objective.

13. A computer program product stored on a non-transitory computer-readable storage medium for deriving at least one multivariate model, wherein said multivariate model being implemented to effect at least one desired objective, said computer program product comprising:
producing a plurality of genomes from available information, wherein each said genome representing a multivariate model, and wherein each said genome comprises a plurality of genes representing parameters of said multivariate model, said parameters including independent variables, relevant variables;

selecting a plurality of genomes for creating at least one initial population, wherein said initial population becomes current generation of genomes population;

constructing a multivariate model from each said genome by decoding each of said plurality of genes within said genome to determine the parameters to be included or excluded for said multivariate model;

defining convergence criteria based on desired objective of said multivariate model.

14. A computer program product according to claim 13, further comprising defining a fitness function based on at least one desired objective of the multivariate model, wherein said fitness function comprises of:

constructing multivariate model from each said genome including transforming each of said plurality of genes within said genome into parameters for said multivariate model;

solving said multivariate model with respect to each of said plurality of genomes, and wherein said solution including producing measurable fitness quantity representation with respect to said desired objective.

15. A computer program product according to claim 14, further comprising executing genetic algorithm on said current generation of genomes population until defined convergence criteria are met, wherein execution of said genetic algorithm comprises continuously repeating steps of:

executing at least one of said fitness function with respect to each and everyone of said plurality of genomes in said current generation of genome population, wherein said fitness function execution produces measurable fitness quantity representation with respect to each of said plurality of genomes, and wherein said fitness representation is assigned correspondingly to each of said plurality of genomes;

creating a plurality of offspring genomes from said population, wherein said creation comprises performing a variety permutation of operations of at least one genome selection operations, at least one of genome crossover operations, at least one of genome mutation operations;

selecting a plurality of said offspring genomes, wherein the said selected offspring genomes become the current generation of genomes population.

16. A computer program product according to claim 15, further comprising selecting at least one multivariate model solution from said genomes population after convergence criteria are met, wherein said selected solution model satisfies at least one of the desired objective.

17. A apparatus for deriving at least one multivariate model, wherein said multivariate model being implemented to effect at least one desired objective, and wherein said apparatus comprises of:

one or more processors comprising:

means of relevant information management including input, output, storage, and display;

means of producing a plurality of genomes from available information, wherein each said genome representing a multivariate model, and wherein each said genome comprises a plurality of genes representing parameters of said multivariate model, said parameters including independent variables, relevant variables;

means of selecting a plurality of genomes for creating at least one initial population, wherein said initial population becomes current generation of genomes population;

means of constructing a multivariate model from each said genome by decoding each of said plurality of genes within said genome to determine the parameters to be included or excluded for said multivariate model;

means of defining convergence criteria based on desired objective of said multivariate model.

18. A apparatus according to claim 17, further comprising means of defining a fitness function based on at least one desired objective of the multivariate model, wherein said fitness function comprises of:

means of constructing multivariate model from each said genome including transforming each of said plurality of genes within said genome into parameters for said multivariate model;

means of solving said multivariate model with respect to each of said plurality of genomes, and wherein said solution including producing measurable fitness quantity representation with respect to said desired objective.

19. A apparatus according to claim 18, further comprising means of executing genetic algorithm on said current generation of genomes population until defined convergence criteria are met, wherein execution of said genetic algorithm comprises continuously repeating steps of:

means of executing at least one of said fitness function with respect to each and everyone of said plurality of genomes in said current generation of genome population, wherein said fitness function execution produces measurable fitness quantity representation with respect to each of said plurality of genomes, and wherein said fitness representation is assigned correspondingly to each of said plurality of genomes;

means of creating a plurality of offspring genomes from said population, wherein said creation comprises performing a variety permutation of operations of at least one genome selection operations, at least one of genome crossover operations, at least one of genome mutation operations;

means of selecting a plurality of said offspring genomes, wherein the said selected offspring genomes become the current generation of genomes population.

20. A apparatus according to claim 19, further comprising means of selecting at least one multivariate model solution from said genomes population after convergence criteria are met, wherein said selected solution model satisfies at least one of the desired objective.

* * * * *